July 9, 1968  E. B. PAL  3,391,521
APPARATUS FOR PURIFYING EXHAUST GASES
Filed April 20, 1966
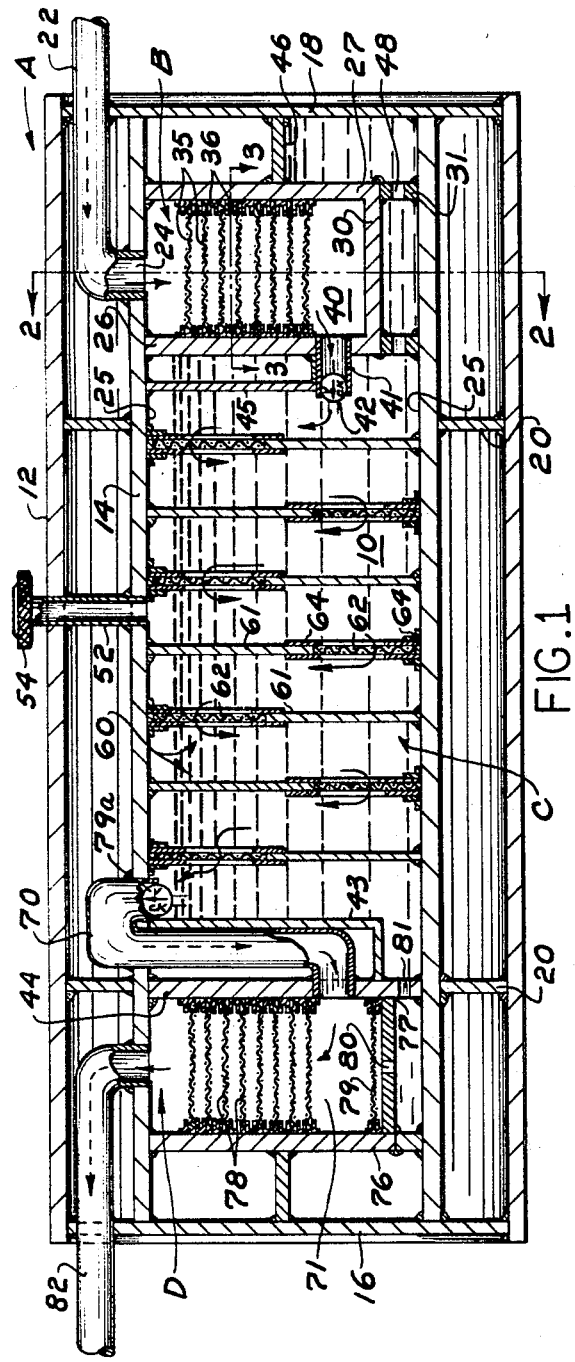
FIG.1
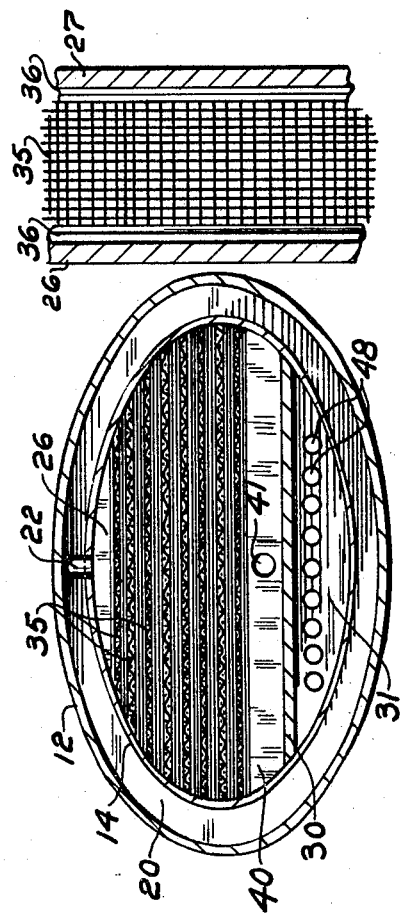
FIG.3
FIG.2
INVENTOR
EUGENE B. PAL
BY *Hoffmann and Yount*
ATTORNEYS

United States Patent Office 3,391,521
Patented July 9, 1968

3,391,521
APPARATUS FOR PURIFYING EXHAUST GASES
Eugene B. Pal, 9327 Buckeye Road,
Cleveland, Ohio 44104
Filed Apr. 20, 1966, Ser. No. 543,874
3 Claims. (Cl. 55—245)

ABSTRACT OF THE DISCLOSURE

A combined muffler and exhaust gas purifier for reducing the noise of and for purifying the exhaust gases of an internal combustion engine is disclosed. The exhaust gases are purified by being passed through a plurality of filter screens made from a catalytic material and by being passed through a purifying liquid. The purifying liquid comprises a solution of honey and syrup, preferably seventy percent syrup and thirty percent honey by volume.

---

The present invention relates to apparatus for purifying exhaust gases, and more particularly to a combined muffler and exhaust gas purifier for reducing the noise of and for purifying the exhaust gases of an internal combustion engine.

An important object of the present invention is to provide a new and improved apparatus for purifying exhaust gases in which the exhaust gases are purified by passing or bubbling the same through a liquid comprised of honey and syrup, preferably a liquid comprised of by volume seventy percent syrup and thirty percent honey.

Another object of the present invention is to provide a new and improved apparatus for purifying exhaust gases, as defined in the next preceding object, and in which the exhaust gases are filtered prior to being passed through the liquid to remove or substantially remove the solid and liquid particles present in the exhaust gases.

Another object of the present invention is to provide a new and improved combined muffler and exhaust gas purifier for reducing the noise of and for purifying the exhaust gases of an internal combustion engine of a motor vehicle, such as an automobile, and which muffler and exhaust gas purifier is of an inexpensive and compact construction, of the same size as a conventional muffler, and so constructed and arranged that it is effective to reduce or muffle the noise of the exhaust gases and effective to filter out various pollutants therein and to chemically treat or purify other pullutants therein so that the exhaust gases being emitted to the atmosphere are free or substantially free from "smog" causing pollutants.

Yet another object of the present invention is to provide a new and improved exhaust gas purifier for purifying the exhaust gases of an internal combustion engine, and in which the exhaust gases are first filtered and strained to remove or substantially remove the solid and liquid particles therein, then passed or bubbled through a liquid, preferably a liquid comprised of honey and white syrup, for purifying the exhaust gases, and then again filtered to remove any remaining solid or liquid particles and to condense any water vapor in the exhaust gases prior to their being emitted to the atmosphere.

A still further object of the present invention is to provide a new and improved exhaust gas purifier, as defined in the next preceding object, and in which the liquid is contained within a compartment having a plurality of spaced baffle means which in conjunction with the liquid therein is effective to muffle or reduce the noise level of the exhaust gases prior to their being emitted to the atmosphere.

The present invention also resides in certain novel constructions, combinations and arrangement of parts and further objects and advantages thereof will be apparent to those skilled in the art to which the invention relates and from the following detailed description of the preferred embodiment thereof described with reference to the accompanying drawings, and in which similar reference characters designate corresponding parts through the several views, and in which:

FIG. 1 is a longitudinal vertical sectional view of a combined muffler and exhaust gas purifier embodying the present invention;

FIG. 2 is a reduced sectional view taken approximately along line 2—2 of FIG. 1;

FIG. 3 is a fragmentary sectional view taken approximately along line 3—3 of FIG. 1.

The present invention provides a novel apparatus for purifying exhaust gases having atmospheric or "smog" producing pollutants therein. Although the present invention is useful for purifying various kinds of exhaust or waste gases, it is particularly useful for purifying the exhaust gases emanating from internal combustion engines, and is herein shown and described as embodied in a combined muffler and exhaust gas purifier for use in automobiles or the like.

Referring to the drawings, a preferred embodiment of a combined muffler and exhaust gas purifier for reducing the noise of and for purifying the exhaust gases of an internal combustion engine of an automobile is there shown. The muffler and exhaust gas purifier comprises, in general, a housing means A having an inlet compartment B in which the exhaust gases are filtered to remove or substantially remove the solid and liquid particles present in the exhaust gases, an intermediate compartment C containing a liquid purifying means 10 for purifying the exhaust gases and for muffling the noise thereof, and an outlet compartment D in which the exhaust gases are again filtered and any moisture present or remaining therein condensed prior to their being emitted to the atmosphere.

The housing means A is here shown as comprising an outer housing 12 and an inner housing 14 supported by the outer housing 12 in spaced relation thereto. The outer and inner housings 12 and 14 are here shown as having common end walls 16 and 18 and a generally elliptical cross section. It will of course be understood that the housings 12 and 14 could have a circular or any other suitable cross-sectional shape. The housing 14 is supported in spaced relation with respect to the housing 12 by the end walls 16 and 18 and by spacer plates 20 at spaced longitudinal locations therealong.

The housing means A includes an inlet means in the form of a conduit 22 which receives the exhaust gases emanating from the engine of the automobile and communicates the same to the inlet compartment B. The conduit 22 has an outer end portion extending outwardly from the end wall 18 and which is adapted to be connected to the exhaust pipe of the automobile engine in any suitable manner and an inner end portion which extends between the spaced side walls of the housings 12 and 14 and has a discharge end 24 in communication with the upper end or top of the inlet compartment.

As best shown in FIG. 1, the inlet compartment B is located within the housing 14 adjacent its right end thereof and is defined by the inner side wall 25 of the housing 14, a pair of longitudinally spaced vertically extending walls 26 and 27 fixed to the inner side wall 25 of the housing 14, and a bottom wall 30 integral with the side walls 26 and 27 and spaced upwardly from the lowermost portion of the side wall 25 of the housing 14. A pair of support plates 31 fixed to and extending between the bottom wall 30 of the inlet compartment B and the lower portion of the side wall 25 of the housing 14 are provided to aid in rigidly supporting the inlet compartment B.

Disposed within the upper end of the inlet compartment B are a plurality of vertically spaced filter elements 35 which extend transversely to the path of movement of the exhaust gases passing through the compartment B, which path of movement is in a downward direction, as viewed in FIG. 1. The filter elements 35 are rectangular in shape and have their marginal side edges received between and preferably fixedly secured to opposed flanges 36 welded or otherwise secured to the side walls 26 and 27 defining the sides for the compartment B. The filter elements 35, in the preferred embodiment, comprise metal screens of medium to fine mesh size. The metal screens are of a silver or bronze material and preferably are arranged such that alternate ones are of silver and bronze. Alternately, silver or bronze metal plates having a multiplicity of openings approximately corresponding to the number of openings for a medium size meshed screen could be employed in place of the screens.

The exhaust gases enter the inlet compartment B at its upper end and flow downwardly therethrough through the filters 35 and into a chamber 40 at the lower end of the compartment B. The exhaust gases, as they flow downwardly through the inlet compartment B, are diffused and filtered with the solid and liquid particles, such as the soot, oil, etc., present therein being removed and dropping by gravity and collecting at the bottom of the chamber 40 as the exhaust gases are turned and passed through the conduit 41. The exhaust gases are emitted from the chamber 40 to the intermediate compartment C via a short conduit 41 fixed to the side wall 26 at a location immediately below the lowermost filter element 35, as viewed in FIG. 1. Disposed within the conduit 41 is a suitable or conventional check valve 42 which is movable to an open position by the pressure of the exhaust gases to permit the exhaust gases to pass into the intermediate compartment C and which is movable to a closed position to prevent the liquid means 10 in the compartment C from flowing into the inlet compartment B when no exhaust gases are passing through the inlet compartment B.

The exhaust gases upon leaving the chamber 40 of the inlet compartment B enter the intermediate compartment C in which they are purified by being passed or bubbled through the liquid purifying means 10 contained therein and in which they are muffled to reduce the noise level thereof. The intermediate compartment C, as best shown in FIG. 1, is an elongated compartment bounded by the inner side wall 25 of the housing 14 and at its left end by a vertically extending L-shaped wall 43 fixed or otherwise secured to the inner side wall 25 of the housing 14 and to a vertically extending wall 44 spaced therefrom and which in turn is fixed to the inner side wall 25. The compartment C is bounded at its right end by a transversely extending L-shaped wall 45 having its opposite ends secured to the inner side wall 25 of the housing 14 and the vertically extending wall 26, the lower portion of the walls 26 and 27 and the bottom walls 30 defining of the compartment B, a horizontally extending wall 46 disposed between the side wall 27 and the end wall 18 and the lower portion of the end wall 18 of the housing 14.

The liquid purifying means 10 disposed within the intermediate compartment C comprises a solution of honey and syrup, preferably a solution having by volume seventy percent clear or white syrup and thirty percent white honey. The liquid substantially fills the compartment C and surrounds the lower portion of the compartment B, the support plates 31 having suitable apertures 48 therein to permit the liquid to flow beneath and around the lower portion of the compartment B. The honey portion of the liquid solution 10 can be any suitable natural or synthetic honey, but is preferably a honey having no moisture therein or a white honey, such as the pure clover type honey manufactured by Walker & Sons Apiaries, Milford. Mich. The syrup portion of the liquid solution is preferably a moistureless or a clear or white syrup, such as the clear syrup marketed under the trademark "Karo" by the Corn Products Company, New York, N.Y.

It has been found that the above described liquid solution 10 effects a purification of the exhaust gases so as to render the same upon being emitted to the atmosphere in a harmless or substantially harmless condition and free from carbon monoxide and other "smog" causing pollutants. Although the exact manner in which the liquid purifying means 10 effects the purification of the exhaust gases is not known, it is believed that the liquid means 10 neutralizes certain of the pollutants, such as the acids in the exhaust gases, and absorbs and/or chemically converts other of the toxic gases and pollutants in the exhaust gases so as to render the same in a harmless or substantially harmless condition.

Other advantages of the liquid solution 10 are that it will not boil off or freeze and thus, is suitable for use in treating exhaust gases having a wide range of temperatures. Moreover, it is inexpensive and will not corrode the metallic materials it comes into contact with. Although the liquid solution 10 has to be replaced from time to time, it is believed that in normal operation of the engine replacement thereof need only be on an annual basis. To enable the compartment C to be filled or refilled with the liquid solution 10, a suitable pipe 52 in communication with the upper end of the compartment C and carried by the housing means A is provided. The pipe is preferably provided with a suitable seal cap 54 at its outer end to prevent any leakage of the liquid solution 10 and/or exhaust gases.

The exhaust gases besides being purified by the liquid means 10 within the compartment C are also muffled while passing therethrough so as to reduce the noise level thereof to that or below that provided by a standard or conventional muffler. To this end, the compartment C is provided with a plurality of longitudinally spaced baffle means 60 which define therebetween a series of chambers and which are effective to cause the exhaust gas to be moved through a tortuous or serpentine path while passing through the intermediate compartment C. Each of the baffle means 60 comprises a plate 61 and a metallic filter element or screen 62. The baffle plates 61 are welded or otherwise secured to the side wall 25 on the housing 14 and the filter elements 62 have their marginal edges received between and preferably secured to spaced flanges 64 on the baffle plate 61 and the inner wall 25 of the housing 14. The plates 61 and the screens 62 of the baffle means 60 are arranged in a staggered relation such that the screens 62 of alternate ones of the baffle means 60 are disposed either adjacent the upper portion of the housing 14 or the lower portion of the housing 14 so as to cause the exhaust gases as they are being passed or bubbled through the liquid solution 10 to be moved in a tortuous or serpentine path. The screens 62 are made of the same material as the screens 35 and also serve to filter the exhaust gases as they are passed therethrough. The screens 62 have openings therethrough which are large enough to allow the liquid 10 to freely pass therethrough.

It has been found that the baffle arrangement in the compartment C in conjunction with the liquid solution 10 contained therein provides for a reduction in the noise level of the exhaust gases to that or below that provided by a conventional muffler. It should also be noted that the baffle arrangement causes the exhaust gases to be moved through a long path of movement while passing through the compartment C and thus, maximizes the amount of contact between the liquid solution 10 and the exhaust gases.

The exhaust gases after passing through the intermediate compartment C flow through a conduit 70 and into a chamber 71 at the lower end of the outlet compartment D. The conduit 70 has its inlet end in communication with the uppermost portion of the intermediate compartment C adjacent the end wall 43 and its discharge end disposed intermediate the upper and lower ends of the outlet compartment D. The conduit 70 has an intermediate portion disposed between the outer and inner housings 12 and 14 so as to cause the exhaust gases to be first moved upwardly as they are emitted from the compartment C prior to being turned and moved downwardly toward the chamber 71 of the outlet compartment D. This conduit arrangement normally prevents the liquid means 10 contained within the compartment C from flowing through the conduit 70 and into the outlet compartment D. However, to further prevent leakage of the liquid solution 10 through hte conduit 70, such as may occur when the automobile is stationary and on an incline, a check valve 79a like the check valve 42 at the inlet end of the conduit 70 is provided.

The outlet compartment D is located adjacent to the left end of the housing 14, as viewed in FIG. 1, and is defined by the inner side wall 25 of the housing 14, a pair of end walls 76 and 44 and a bottom wall 77. The outlet compartment D at its upper end has a plurality of vertically spaced filter elements 78 which are of the same construction and material as the filter elements 35 for the inlet compartment B and which are secured to the walls 76 and 44 in this same manner that the filter elements 35 are secured to the walls 26 and 27. The outlet compartment D has its innermost end wall 44 spaced from the end wall 43 of the intermediate compartments C.

The filter elements 78 of the outlet compartment D filter out any remaining solid or liquid particles contained in the exhaust gases as they pass upwardly through the outlet compartment D and also function as a condenser for condensing any water vapor or moisture remaining or present in the exhaust gases as they are passed therethrough. By providing an outlet compartment D which is spaced longitudinally from the intermediate compartment C, the walls defining the compartment D will remain relatively cool as compared to the walls defining the intermediate compartments C and thus, the filter elements 78 will be effective to condense the water vapor present or remaining in the exhaust gases. The solid or liquid particles filtered out and water vapor which is condensed by the filter elements 78 drop by gravity toward the bottom wall 77 of the chamber 71 of the outlet compartment D. The chamber 71 adjacent the bottom wall 77 is provided with a fine mesh metallic screen 79 having its marginal sides fixed to the end walls 76 and 44 and the bottom and end walls 77 and 44 each having an opening 80 and 81, respectively, therein for communicating the portion of the chamber 71 below the screen 79 with the intermediate compartment C. The screen 79 has a mesh size such that the liquid 10 in the compartment C cannot flow upwardly into the compartment B. The water, etc. is drained and/or forced through the screen 79 and into the liquid 10 by the pressure of the exhaust gases passing through the compartment D.

The housing means A also includes outlet means in the form of a conduit 82 for communicating the exhaust gases being emitted from the outlet compartment D to the atmosphere. The conduit 80 has an outer end portion extending outwardly from the end wall 16 and which is adapted to be attached or connected to a tailpipe of an automobile and an inner end portion disposed between the housings 12 and 14 having an inlet end secured to the side wall 25 of the housing 14 at its upper end.

As previously mentioned, the filter elements 35 in the inlet compartment B are effective to remove or substantially remove the solid and liquid particles present in the exhaust gases as they pass through the inlet compartment B with the solid and liquid particles dropping by gravity and collecting at the bottom of the chamber 40 as the exhaust gases are turned and passed through the conduit 41 into the intermediate compartment C. The filter elements 35 function to diffuse the exhaust gases as they enter the inlet compartment B and impinge against the filter elements 35 and thus, cause the solid and liquid particles to be slowed down and in effect strained from the exhaust gases. The filter elements 35 are maintained in an unclogged condition due to the water and water vapor in the exhaust gases during normal operation as well as to the water which is blown through the exhaust system due to the condensation formed on the inner walls of the cylinders of the engine. This water and water vapor is effective to "wash" the filters and cause the solid and oily liquid particles to be passed through the filter elements and after passing through the last filter element to drop by gravity and collect at the bottom of the inlet compartment B.

It is believed that when the engine is initially started, the water vapor present in the exhaust gases will be condensed by the filter elements 35 in the inlet compartment B due to the fact that the walls defining the inlet compartment B and the filter elements 35 are relatively cool and that the amount of the water vapor being condensed becoming less as the exhaust gases passing through the inlet compartment heat the inlet compartment B to a temperature substantially to that of the exhaust gas. It is also believed that the silver and bronze screens 35 act as catalysts to cause the oxygen present in the exhaust gases to combine with the carbon monoxide therein to form carbon dioxide.

The water collected at the bottom of the chamber 40 of the inlet compartment B is adapted to be vaporized and then mixed with the exhaust gases passing into the intermediate compartment C. To this end, the liquid means 10 in the intermediate compartment C surrounds the lower end of the inlet compartment B. As the exhaust gases are being passed through the liquid means 10 the latter is heated and this heat is conducted by the walls forming the lower end of the inlet compartment B in contact with the liquid means 10 to the water collected at the bottom thereof. The walls forming the lower end of the compartment B are heated to a temperature such that the water collected therein is vaporized. Alternately, if desired, the inlet compartment B could be completely separated from the compartment C and the exhaust gases passed directly around the lower end portion of the inlet compartment B to heat the same prior to being passed through the inlet compartment B.

It should also be noted that the spaced filter elements 35 and 78 of the inlet and outlet compartments B and D, respectively, define expansion chambers therebetween, which elements and chambers aid in muffling or reducing the noise level of the exhanst gases.

From the foregoing, it can be seen that a novel method and apparatus has been provided for purifying exhaust or waste gases, and especially the exhaust gases of an internal combustion engine. Furthermore, it can be seen that a novel method and apparatus for purifying exhaust gases in which exhaust gases are purified by being passed or bubbled through a liquid solution comprised of honey and syrup has been provided. Additionally it can be seen that a novel combined exhaust gas purifier and muffler for purifying the exhaust gases of an automobile engine so that to render the same free from "smog" causing pollutants and for muffling the noise of the exhaust gases has been provided.

Although the novel method and apparatus of this invention has been illustrated and described herein to a somewhat detailed extent, it will be understood, of course, that the invention is not to be regarded as to being limited correspondingly in scope but includes all changes and modifications coming within the terms of the claims hereof.

Having described my invention, I claim:

1. A combined muffler and exhaust gas purifier for muffling the noise and purifying the exhaust gases of an internal combustion engine comprising; a housing means having a first compartment therein, an inlet means for communicating the exhaust gases to said first compartment, filter means in said first compartment extending transversely to the path of movement of said exhaust gases for filtering said exhaust gases to remove the solid and liquid particles therefrom, a second compartment in said housing means, means for communicating the exhaust gases from said first compartment to said second compartment, said second compartment having a plurality of spaced baffle means extending transversely to the flow path of the exhaust gases for causing the latter to move in a tortuous path therethrough and for reducing the noise thereof, said second compartment containing liquid means for purifying the exhaust gases, said exhaust gases being in contact with and passing through said liquid means while moving in said tortuous path, and a third compartment in said housing means, means for communicating the exhaust gases from said second compartment to said third compartment, said third compartment having filter means extending transversely to the path of movement of the exhaust gases for filtering the same, and means for communicating the exhaust gases from said third compartment to the atmosphere, said filter means in said first and third compartments comprising a plurality of spaced metallic screens, said first compartment having a chamber at its lower end into which the solid and liquid particles filtered out by the filter means thereof drop, and wherein said liquid means in said second compartment surrounds the lower end of said first compartment, said liquid means when heated by the exhaust gases passing therethrough heating said lower end of said first compartment to vaporize any water contained in the lower end of said first compartment.

2. A combined muffler and exhaust gas purifier, as defined in claim 1, and wherein said liquid means in said second compartment is a solution comprising by volume approximately thirty percent honey and seventy percent clear syrup.

3. A combined muffler and exhaust gas purifier, as defined in claim 1, and wherein said filter means in said first compartment comprises a plurality of spaced metallic screens made from a catalytic metarial.

References Cited

UNITED STATES PATENTS

| | | | |
|---|---|---|---|
| 873,785 | 12/1907 | Reichel. | |
| 1,032,536 | 7/1912 | Gerli et al. | |
| 1,415,418 | 5/1922 | Wachtel. | |
| 1,889,325 | 11/1932 | Whaley | 55—307 |
| 2,501,541 | 3/1950 | Sharp | 55—256 |
| 2,612,745 | 10/1952 | Vecchio | 55—256 |
| 3,282,047 | 11/1966 | Wertheimer | 55—229 |

SAMIH N. ZAHARNA, *Primary Examiner.*

REUBEN FRIEDMAN, *Examiner.*

J. ADEE, *Assistant Examiner.*